United States Patent [19]

Lacchia

[11] 4,214,708

[45] Jul. 29, 1980

[54] ELECTROSTATIC PAINT SPRAY APPARATUS HAVING ROTARY SPRAY HEAD WITH AN AIR SEAL

[75] Inventor: Adrien Lacchia, Meylan, France

[73] Assignee: Air Industrie, Courbevoie, France

[21] Appl. No.: 969,315

[22] Filed: Dec. 14, 1978

[30] Foreign Application Priority Data

Dec. 20, 1977 [FR] France ................................ 77 38363

[51] Int. Cl.[2] .......................... B05B 5/04; B05B 3/10; F16J 15/40

[52] U.S. Cl. ................................ 239/703; 239/214.25; 239/223; 239/224; 277/53; 308/36.3

[58] Field of Search ................................ 239/700–704, 239/214, 214.25, 223, 224; 277/53–57; 308/36.3

[56] References Cited

U.S. PATENT DOCUMENTS

| | | | |
|---|---|---|---|
| 2,386,898 | 10/1945 | Karassik | 277/53 X |
| 2,584,973 | 2/1952 | Andermatt | 239/223 X |

FOREIGN PATENT DOCUMENTS

| | | | |
|---|---|---|---|
| 2336181 | 7/1977 | France | 239/703 |

*Primary Examiner*—Andres Kashnikow
*Attorney, Agent, or Firm*—Brisebois & Kruger

[57] ABSTRACT

Electrostatic paint spray apparatus having rotary spray head with an air seal. To prevent paint or solvent from entering antifriction bearings, the shaft rotating at high speed is provided with an air seal in an intermediate zone between the bearings and the spray head. Air from a source of compressed air communicating with inlet flows through channel into groove and from there via passageways into the annular air feed chamber. Air leaves the feed chamber between depending lip and shaft, preventing the entry of paint or solvent, and operating even when the apparatus is not spraying. Air is throttled in the other direction through the air flow path to an expansion chamber and then is vented to the atmosphere via vents without contaminating the bearings.

7 Claims, 2 Drawing Figures

ELECTROSTATIC PAINT SPRAY APPARATUS HAVING ROTARY SPRAY HEAD WITH AN AIR SEAL

Figure 1:
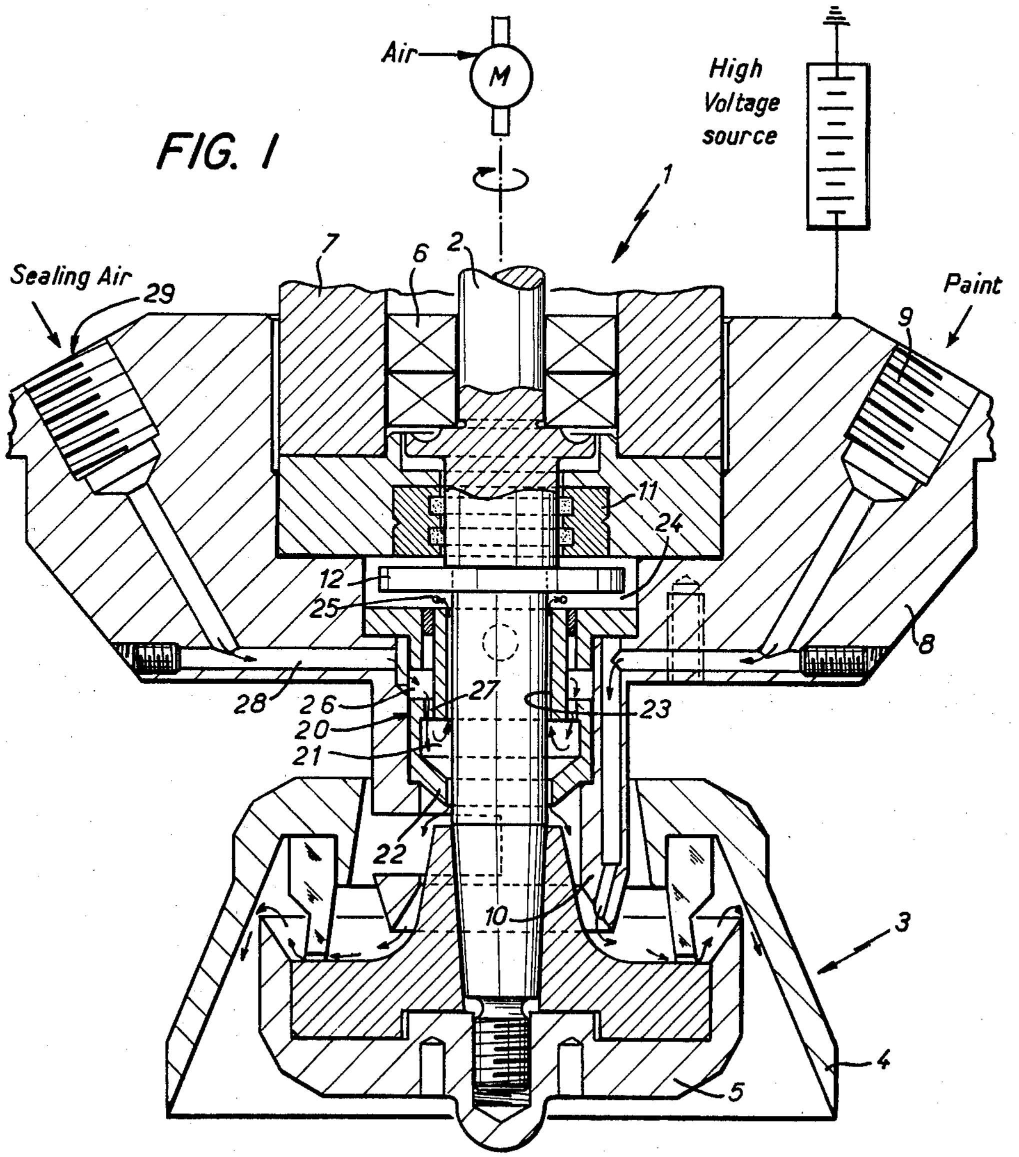

The present invention relates to an electrostatic paint spray apparatus having a rotary spray head, and more particularly to such an apparatus in which the antifriction bearing for the shaft rotating the rotary spray head is protected from paint in the spray head by an air seal forming an air barrier between the spray head and the antifriction bearing.

Such rotary spray heads are of the bowl or disc type and are mounted at an end of the shaft driven by a high speed motor. An injection collar is arranged round the shaft between the motor and the rotary spray head, and a distributing ring for paint or solvent protrudes into the spray head and defines an annular flow path by the slight clearance between it and the shaft, in a zone located remote from the antifriction bearings for the shaft. A transition zone is thus defined between the antifriction bearing and the spray head. An air seal forming an air barrier is disposed in the transition zone.

In such electrostatic paint spray apparatus the atomization of the paint into fine droplets is obtained by centrifugation at the periphery of the rotary spray head rotating at a speed of several tens of thousands of rpm (e.g. 40,000 rpm for a disc type spray head and 60,000 rpm for a bowl type spray head). The motor for rotating the shaft is usually a compressed air turbine.

At such high rotational speeds it is out of the question to protect the bearings for the shaft with conventional friction sealing members or gaskets to prevent the paint, rinsing or washing solvent from entering the bearings. Such conventional friction sealing members would shortly overheat and fail.

Seals have been used which provide only slight positive clearance between the rotating and fixed parts; despite the reduction in clearance it is not possible to prevent the entry of paint and other liquids.

Protective discs rotating with the shaft have also been used. They are of concave configuration and encase the bearing. Protection of the bearing during rotation is somewhat better but it is no more effective when the apparatus is not spraying.

According to an old technique exhaust air from the turbine has been led through the bearings so that this air creates an air barrier against the penetration of paint or solvent. The air used must be very clean so as not to introduce foreign matter into the antifriction bearings. Further, the flow of air tends to entrain with it lubricating grease from the antifriction bearings. Finally, when the spray apparatus is stopped in order to clean the spray head with solvents, the bearings are left unprotected.

An object of the invention is an electrostatic spray apparatus of the foregoing type in which the antifriction bearings may even be protected by an air barrier when the apparatus is not spraying.

Another object of the invention is such an electrostatic spray apparatus in which the air flow path does not include or traverse the antifriction bearings.

According to one aspect of the invention there is provided paint spray apparatus comprising a shaft mounted for rotation in an antifriction bearing, a rotary spray head mounted at one end of the shaft, an injection collar arranged around the shaft for distributing paint or solvent through a distributing ring protruding into the spray head, an air seal adapted to be connected to a source of compressed air and defining in operation an air barrier against paint, said air seal including an air flow path running along the shaft axially intermediate the spray head and the antifriction bearing and connected to barrier air venting means for venting the barrier air to the surroundings before it reaches the antifriction bearing.

Preferably the air flow path is an air throttling passage, the downstream end of the flow path being connected to an expansion chamber, the barrier air venting means communicating between the expansion chamber and the surroundings.

In such an arrangement the air pressure in the air seal may be controlled so as to ensure effective sealing toward the spray head to prevent the ingress of paint or solvent, without the air flow disturbing the spraying of paint or solvent. Air exhausted through the venting means without reaching the bearings, prevents foreign matter entrained in the air from penetrating into the bearings.

According to another aspect of the invention there is provided a method of protecting the antifriction bearing for a rotary shaft in an electrostatic paint spray apparatus comprising a shaft mounted for rotation in an antifriction bearing, a spray head mounted for rotation with the shaft, means for distributing paint to the spray head as it rotates, comprising throttling air along the shaft in a direction away from the spray head, expanding the throttled air and then venting the expanded air to the atmosphere before it reaches the antifriction bearing.

The features and advantages of the invention will become apparent from the following description, given by way of example, with reference to the accompanying drawing.

Figure 2:
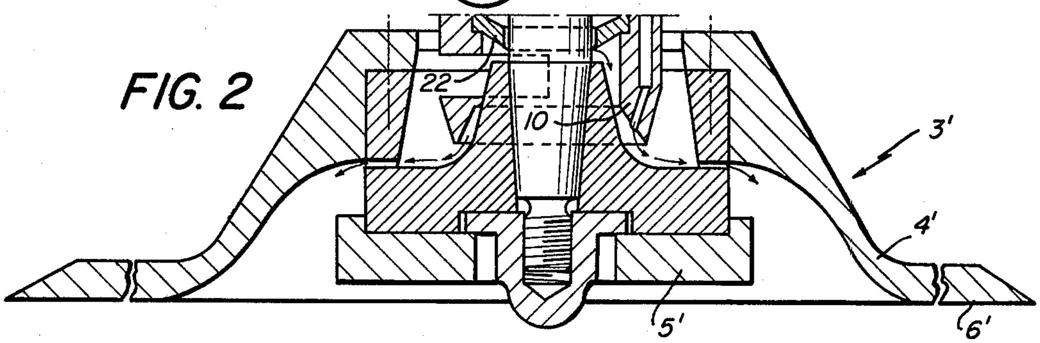

FIG. 1 is a longitudinal section of an embodiment of a paint spraying apparatus according to the present invention having a bowl spray member; and FIG 2 is a reduced size partial view of the lower portion of the apparatus of FIG. 1, and provided with a disc spray member.

There is illustrated an electrostatic spray apparatus designated overall by reference 1 comprising a shaft 2 driven at high speed by a motor, preferably a compressed air turbine, not shown. A spray head 3, of the bowl type as illustrated, is mounted at the end of the shaft 2 for rotation therewith and comprises an outer downwardly opening frustoconical bowl spray member 4 topped by an upwardly opening distributing cup 5. The shaft 2 rotates in antifriction ball bearings 6 mounted in the body member 7 of the spray apparatus. An injection collar 8 is fixed to the end of the body member 7 and comprises at least one paint inlet 9 communicating through channels to a distributing ring 10 around the rotary distributor 5. The shaft 2 leaves the body member of the spray apparatus through a conventional frictionless seal 11 of bronze reinforced polytetrafluoroethylene having grease accommodating grooves. Below the seal 11 on the shaft 2 is mounted a sealing disc or washer 12 adapted to provide dynamic sealing means for the bearing.

Conventionally, in operation, the shaft 2 is driven at high speed by a compressed air turbine. The paint to be sprayed introduced by the inlet 9 into the injection collar 8 passes through channels to the distributing ring 10. From there the paint drops to the rotary distributor 5 and is ejected under centrifugal force in the inner wall of the bowl spray member 4, via orifices in the connecting member interposed between the bowl spray member 4 and the rotary distributor 5. Centrifugal action causes the paint to flow to the lower edge of the spray head 3 from which it is atomized into a fine film. As the spray head operates at high voltage the particles of atomized paint are electrically charged and therefore attracted by the grounded articles to be painted at which the spray head is pointed.

An air seal designated generally by numeral 20 is lodged in a cavity in the injection collar 8. The air seal 20 comprises an annular air feed chamber 21 opening onto the shaft 2 and having a depending lip 22 defining around the shaft slight positive clearance towards the bowl spray member 3 and an upper annular air flow path 23 defined by the slight positive radial clearance round the shaft 2 running towards an expansion chamber 24 which accommodates the dynamic sealing disc or washer 12. Radial vents 25, defining barrier air venting means are formed in the chamber 24 and continue through the injection collar 8 to the surroundings. The air seal 20 also comprises an annular groove 26 at its outer periphery in communication with the annular air feed chamber 21 through passageways 27 and a channel 28 defined in the injection collar 8, together with an auxiliary air inlet 29.

The operation of the apparatus described above is as follows. The auxiliary air inlet 29 is connected to an external source of compressed air through a pressure reducing valve (not shown). The air which enters through the auxiliary air inlet 29 is carried through channel 28 into the annular groove 26. Air then passes from the groove 26 into the annular feed chamber 21 through passageways 27. Air escapes from the annular feed chamber 21 to bowl spray member, through the narrow clearance existing between the lip 22 and shaft 2, preventing entry of paint or solvent. Air also escapes from the feed chamber 21 through the upper annular air flow path 23 which is defined by small radial clearance around shaft 2. The air throttled in the air flow path 23 escapes into the expansion chamber 24 and from there, to the atmosphere through vents 25 without being able to go beyond the disc or washer seal 12, through the frictionless seal 11, on to the antifriction bearings 6.

Tests have been carried out with the air seal as described above in which the clearance between the lip 22 and the shaft 2 was in the vicinity of 0.15 mm, with an hourly flow rate of about 1.5 $Nm^3$ under standard pressure and temperature conditions. The flow of paint or solvent was used to check the liquid-tightness that is, the effectiveness of the air barrier. The axis of the spray apparatus was oriented horizontally as well as vertically, with the bowl spray member opening upwards; the air seal proved to be impassable for commonly used paints and solvents. Subsequent tests under normal operating conditions with the bowl spray member rotating at 40,000 rpm revealed no penetration of paint beyond the lip 22 while grease in the bearings 6 was conserved in excellent condition.

Although the invention has been described above in FIG. 1 with reference to a bowl spray member, it should be apparent that a similar air seal can be used with a disc-type spray member as seen in FIG. 2, in which identical parts are indicated by identical numerals. Thus, spray head 3′ has a disc spray member 4′ with a flaring internal wall configuration defining the path of flow of the atomized paint to the disc shaped face 6′.

Obviously the present invention is not limited to the described embodiment but encompasses all variations, modifications and equivalents within the scope of the invention as defined by the appended claims.

What I claim is:

1. In an electrostatic paint spray apparatus including a body member, a shaft mounted for rotation in bearing means in the body member, a rotary spray-head mounted at one end of the shaft, an injection collar arranged around the shaft for distributing paint or solvent through a distributing ring protruding into said spray head; the improvement comprising an air seal adapted to be connected to a source of pressurized air and defining an air barrier against paint or solvent, said air seal including an air flow path running along the shaft axially intermediate the spray head and the bearing means and connected to barrier air venting means for venting barrier air to the surroundings before reaching the bearing means, and further comprising an annular air feed chamber connected to the upstream end of said air flow path which is defined between the shaft and a distribution sleeve operatively disposed between the injection collar and the spray head, an air inlet in the injection collar being adapted to be connected to said source of pressurized air and to said annular feed chamber via an annular distributing groove.

2. The improvement of claim 1, wherein said air flow path is adapted to throttle air, and wherein the downstream end of said flow path is connected to an expansion chamber, said barrier air venting means communicating between said expansion chamber and the surroundings.

3. The improvement of claim 2, wherein a dynamic sealing washer or disc is accommodated inside said expansion chamber axially between said barrier air venting means and the bearing means for the shaft.

4. The improvement of claim 1 or 2, wherein said shaft is driven by a pneumatic motor and said pneumatic motor comprises the source of pressurized air, and pressure drop means disposed in the line carrying air from said pneumatic motor to said air seal.

5. The improvement of claim 1 or 2, wherein said rotary spray head comprises a bowl spray member.

6. The improvement of claim 1 or 2, wherein said rotary spray head comprises a disc spray member.

7. The improvement of claim 1 or 2, said annular air feed chamber having an annular outlet remote from said axial flow path and communicating with the interior of said spray head, whereby the air leaving the feed chamber prevents the entry of paint or solvent.

* * * * *